Patented Jan. 9, 1951

2,537,036

UNITED STATES PATENT OFFICE 2,537,036

RUBBERY COPOLYMER COMPOSITIONS

Ivor M. Colbeth, Maplewood, N. J., assignor to The Baker Castor Oil Company, Jersey City, N. J., a corporation of New Jersey No Drawing. Application January 22, 1947, Serial No. 723,659

11 Claims. (Cl. 260—23.7)

This invention relates to attaching rubbery butadiene-acrylonitrile copolymers and combinations thereof with other polymeric compounds to other materials. The materials to which the rubbery copolymers of this invention can be attached are, for example, natural and other synthetic rubbers, metals, wood, leather, ceramic materials, and the like. The rubbery copolymers of this invention may be formed into any desired shape prior to their attachment to other materials. This is a continuation-in-part of my application Serial No. 518,579, filed January 17, 1944, now abandoned.

Heretofore, it has not been possible to bond a natural or synthetic rubber easily and satisfactorily to other materials by using cements other than those with a rubber or synthetic rubber base. By this invention, the properties of rubbery butadiene-acrylonitrile copolymers are so modified that non-rubber cementing materials, such as nitrocellulose or vinyl resin cements, can be used effectively in conjunction therewith. Such non-rubber cements are cheaper and more easily prepared than cements containing a rubber.

The desired properties can be imparted to rubbery butadiene-acrylonitrile copolymers by incorporating modifying agents therein. The modifying agents of this invention are quite specific in their action, being effective only with the rubbery butadiene acrylonitrile copolymers and combinations thereof with other polymeric compounds. However, the use of these modifying agents, according to the method of this invention, produces highly desirable and efficacious results.

The rubbery copolymers of butadiene and acrylonitrile are, in general, those containing from about 15% to about 45% of acrylonitrile; in other words, such copolymers are those comprising acrylonitrile and butadiene in the proportions from about 1.22 to about 5.67 parts of butadiene per part of acrylonitrile. Typical commercial products composed of this type of copolymer are: Perbunan and Perbunan-Extra of the Standard Oil Company of New Jersey; Butaprene of the Firestone Tire & Rubber Company; Hycar OR of Hycar Chemical Company; and Chemigum of the Goodyear Tire & Rubber Company. In general, as the percentage of acrylonitrile in the copolymer is increased, the resistance of the copolymer to solvent swelling increases, but at the expense of low-temperature flexibility.

The modifying agents which have been found useful with the butadiene-acrylonitrile copolymers are oxidized and polymerized ester-type oils. These oils may be derived from animal, fish or vegetable sources or, alternatively, may be synthesized. Typical oils satisfactory for use in the preparation of the modifying agents of this invention are whale oil, sardine oil, menhaden oil, castor oil, dehydrated castor oil, soyabean oil, cottonseed oil, rapeseed oil, linseed oil, tung oil, oiticica oil, and the like. Synthetic ester-type oils suitable for this purpose are prepared by the esterification of aliphatic, unsaturated acids containing more than 6 carbon atoms with polyhydric alcohols. Satisfactory acids for this purpose are, for example, those derived from naturally occurring oils such as are listed above, as well as undecylenic acid, geranic acid, undecolic acid, similar unsaturated polybasic acids, and the like. Polyhydric alcohols which can be used in the synthesis of these ester-type oils are, for example, glycerine, ethylene glycol, propylene glycol, pentaerythritol, sorbitol, sebacyl alcohol, glyceraldehyde, dihydroxy acetone, and methoxy propanediol. The aliphatic acid or polyhydric alcohol radicals may also have such substituents as halogen, amino, substituted amino, sulfonic acid, sulfate, phosphonic acid, cyanide, borate groups and the like.

The modifying agents of this invention may suitably be produced by contacting ester-type oils such as have been indicated with an oxygen-containing gas at a somewhat elevated temperature in the range from about 100° to about 175° C. or higher. Both oxidation and polymerization reactions take place during this treatment. Air blowing of the oils is an effective way of carrying out these reactions. The product may be solid in nature, having a semi-rubbery, gel-like structure. For example, in the case of blown castor oil, the gel may remain solid up to a temperature of approximately 100° C. When the air-blowing is not carried far enough to produce a solid gel, the products of the air-blowing are viscous, oily liquids. Such oils, when extremely viscous, for example, those having a Saybolt Universal viscosity at 210° F. of 50,000–100,000 seconds, are also suitable as modifying agents for rubbery butadiene-acrylonitrile copolymers.

The amount of modifying agent to be incorporated in the rubbery copolymer may vary from about 15% to about 50%. Amounts of blown oil as low as 1% can be used, but better results are achieved with the indicated larger amounts. The preferred range of oil to be used is from about 27% to about 35%.

The presence of the solid or highly viscous oil in the rubbery butadiene-acrylonitrile copolymer causes the surface properties of the rubber to be modified. A strong and tenacious bond between the rubber and cementing materials can be attained as a result. As is shown by the data presented in the following examples, the bond obtainable between the unmodified rubber and cementing materials is quite weak and of little utility.

In practice, the surface of the modified rubber to which another material is to be joined is treated so as to render it tacky. This treatment may include the application of a solvent such as acetone. Ordinarily, the joining process is carried out at room temperature, but the use of a higher temperature may be advantageous in some cases. A cement, such as a nitrocellulose cement or a vinyl resin cement, is interposed between the surfaces of the rubber and other material to be joined thereto. When pressure is applied to the assembly comprising a shaped piece of rubber, another object having a surface conforming to that of the rubber surface to which it is to be joined, and an intermediate layer of cementing material, the contacting surfaces become so strongly joined that they cannot be separated without in some cases tearing away part of the materials which are cemented together.

As has been indicated, a variety of solid materials can be joined to a rubbery butadiene-acrylonitrile copolymer according to this invention. One combination which has great utility is that of a butadiene-acrylonitrile copolymer with leather. Tests have been carried out in which rubber soles have been applied to shoes, the rubber being a butadiene-acrylonitrile copolymer containing about 25% of acrylonitrile and being blended with 30 parts of a solid, gelled castor oil. The cement used for joining the modified rubber and leather was a nitrocellulose cement containing a highly blown castor oil, known as Baker's Pale #4 Oil, as a plasticizer. The rubber soles became cemented to the leather surfaces easily and firmly, and wore well during the test period which amounted to a number of months.

In general, the solid or highly viscous oils are blended with the rubbery butadiene-acrylonitrile copolymer during the normal compounding operation. This compounding is preferably carried out by milling on a standard rubber mill with cooling. Typical compounding procedures are illustrated in the examples. Following the compounding operation, the resulting stocks are vulcanized in the usual way. Thus, the incorporation of the solid or highly viscous oils requires no changes in the normal rubber compounding and vulcanization techniques. When warranted by special circumstances, the vulcanization of the modified rubber can be omitted until after the rubber has been cemented to another material.

In addition to the main benefits to be secured by this invention, certain auxiliary benefits accrue from the incorporation of solid or highly viscous oils in rubbery butadiene-acrylonitrile copolymers. Incorporation of such oils, due to their plasticizing effects, aids in the mechanical break-down of the rubber on the mill. These oils are also excellent agents for the dispersion of finely divided solids, such as carbon black, carbonates, zinc oxide, solid colors, etc.; consequently, the compounding of such ingredients with the rubber is speeded up and the resulting rubber compounds are more uniform in composition. Further, in view of the peroxide content of these modifying oils, such oils aid in the vulcanization of the rubber.

Results similar to those described above are obtained by incorporating the oxidized and polymerized ester-type modifying agents of this invention in compositions comprising combinations of rubbery butadiene-acrylonitrile copolymers and vinyl chloride polymers or copolymers. Nitrocellulose and other cements and films do not normally adhere to these combinations, but good adherence of such cements and films can be effected according to this invention. The indicated polymer combinations may be produced in any desired manner, including mixing of the polymers on a mill, copolymerization of the monomers involved, coprecipitation of the polymers from solution, and the like. The oxidized and polymerized esters of the lower molecular weight alcohols are especially valuable modifying agents for these polymer combinations, as the blown glyceride oils are not very soluble in the vinyl chloride copolymers.

Improved results are obtained when the solid or highly viscous oils of this invention are further modified. Typical modifying agents capable of effecting the indicated improvements are esters of monohydric alcohols, sulfonated esters, heavy metal soaps of glyceride oil fatty acids, sulfonated heavy metal soaps of glyceride oil fatty acids, amino soaps, petroleum sulfonates, and the like. Typical esters suitably used as modifying agents for the oxidized and polymerized oils are esters of the fatty acid components of the vegetable, fish, and animal oils with monohydric alcohols, including glycol mono-ethers, and esters of monohydric alcohols with mono- or polybasic acids, such as undecylenic acid, pelargonic acid, nonenoic acid, heptanoic acid, azelaic acid, sebacic acid, and the like.

The oxidized and polymerized oils may be reinforced by the incorporation therein of finely divided solids. Especially suitable solid addends are the various grades of reinforcing fillers composed of carbon, and the various finely divided silicon-containing solids.

These various modifying and reinforcing agents are preferably added to the oils at an appropriate stage in the oxidation and polymerization thereof. There is a characteristic point in the oxidation-polymerization process for each oil and each addend; if the added material is incorporated with the oil that is being polymerized before this point, the polymerization action is apt to be hindered; whereas, the polymerization is speeded up if the addition is made after the indicated point in the reaction has been passed. A few tests enable one to determine when to introduce the addends in the process. It is usually advisable to carry the polymerization to a fairly advanced state before introducing the additional materials, and yet not so far as to make their homogeneous solution or dispersion in the polymerized oil difficult or impossible. Best results are attained when the addend is used in amounts varying from 5 to 30%, based on the final oil mixture.

The following are examples of the preparation of the oxidized and polymerized oils used as modifying agents for rubbery butadiene-acrylonitrile copolymers according to this invention:

*Example 1.*—85 lbs. of castor oil were heated at about 140° C. for 48 hours. Air was blown through the oil throughout this period of heating. The product of this heating and blowing operation was then drawn off as a solid oil. This solid oil has been found to be suitable for the modification of rubbery butadiene-acrylonitrile copolymers so as to enable them to be cemented to other materials.

*Example 2.*—90 lbs. of dehydrated castor oil were blown with air at 110°–120° C. until the oil reached a solid, gelled condition. The product was suitable for the modification of rubbery butadiene-acrylonitrile copolymers according to this invention.

*Example 3.*—85 lbs. of soyabean oil were heated to 105°–115° C. and blown with air for a period of 20 hours. The product was similar to that of the preceding examples.

*Example 4.*—In a similar manner, 100 lbs. of sardine oil were heated and blown with air until the oil attained a Saybolt Universal viscosity at 210° F. of 100,000 seconds.

*Example 5.*—Similarly, 100 lbs. of a di-ester of pentaerythritol and ricinoleic acid were heated and blown with air until a solid, gelled product resulted.

*Example 6.*—In a similar manner, the dithiodiglycol ester of licanic acid was heated and blown with air to a solid, gelled condition.

*Example 7.*—90 parts of castor oil were heated to 140° C. and blown with air until the viscosity of the oil reached 3600 seconds Engler at 100° C. Then, 10 parts of methyl Cellosolve ricinoleate were added, and blowing was continued at 110° C. until a solid, gelled condition was reached. This condition was reached about 10% sooner than if the methyl Cellosolve ricinoleate had not been added. The product was softer and smoother than normal solid castor oil, and somewhat more effective for the modification of rubbery butadiene-acrylonitrile copolymers.

*Example 8.*—90 parts of dehydrated castor oil were blown with air at 140° C. until the oil reached an Engler viscosity of 3000 seconds at 100° C. Then, 10 parts of butyl octadecadienoate were added, and the mixture was blown at 110° C. until it reached a solid, gelled condition. The product was not as dry or rubbery as a normal gel from dehydrated castor oil, and was more effective as a modifying agent for rubbery butadiene-acrylonitrile copolymers.

*Example 9.*—100 parts of pentaerythritol ricinoleate were heated to 285° C. while maintaining a nitrogen atmosphere over the ester, and agitating the latter. When the oil reached a viscosity of Z–3 (Gardner-Holdt), the temperature was lowered to 110° C. 25 parts of sulfonated ethyl linoleate were then stirred into the oil; air-blowing of the oil was started at the same time and was continued until the composition reached a solid, gelled condition. This product and those of the following examples were found to be quite effective in modifying rubbery butadiene-acrylonitrile copolymers according to the method of this invention.

*Example 10.*—100 parts of the product obtained by the substantially complete esterification of diethylene glycol with tung oil acids were heated under vacuum at a temperature of 275° C. When the ester reached a viscosity of Z–3 (Gardner-Holdt), the temperature was lowered to 120° C. 10 parts of sulfonated castor oil were then stirred into the oil; air-blowing of the oil was started at the same time, and was continued until the composition reached a solid, gelled condition.

*Example 11.*—100 parts of castor oil were heated to 155° C. while air was blown through the oil. When the oil reached a viscosity of Z–3 (Gardner-Holdt), 27.5 parts of lead ricinoleate were introduced with vigorous stirring. The heating and air-blowing were continued until test samples showed that the oil was approaching a gelled condition, whereupon it was dropped into drums without cooling; the retained heat completed the polymerization to a gelled condition.

*Example 12.*—100 parts of oiticica oil were heated to 115°–125° C. and blown with air. Soon after the oil started to show an increase in body, 5 parts of barium oleate were added to the oil with vigorous agitation. The air-blowing and the heating were continued until the product had a Saybolt Universal viscosity of 80,000–90,000 seconds at 210° F.

*Example 13.*—85 lbs. of castor oil were heated to 145° C. and blown with air until the viscosity of the oil had increased to 3500 seconds Engler at 100° C. Then, 15 lbs. of channel black (Continental Carbon Co.'s Grade D) were stirred into the oil, and blowing was continued at 110° C. The mixture was drawn off as a solid oil after 8 hours of additional blowing. The product was jet-black and smooth in texture.

*Example 14.*—85 lbs. of soyabean oil were heated to 132° C. and blown with air until the viscosity of the oil had increased to 1500 seconds Engler at 100° C. Then, 15 lbs. of carbon black of vegetable origin, known as Darco, were stirred into the oil, and air-blowing was continued at a temperature of 105° C. The mixture reached a solid, gelled condition in an additional 3.5 hours of blowing, compared to 20 hours required when no fine solid is present. The product was jet-black and very smooth in texture.

*Example 15.*—100 parts of linseed oil were heated to 120°–125° C. and blown with air. Soon after the oil started to show an increase in body, 20 parts of McNamee clay (aluminum silicate) were added to the oil. The heating and air-blowing were continued until a very high viscosity was reached. The hot mixture was then dropped into containers, where it finally reached a solid, gelled condition.

*Example 16.*—100 parts of whale oil were heated to 250° C. while maintaining a nitrogen atmosphere over the oil and agitating the latter. When the oil reached a viscosity of Z–3 (Gardner-Holdt), the temperature was lowered to 100° C. 25 parts of slate flour were then stirred into the oil; air-blowing of the oil was started at the same time, and was continued until the composition reached a solid, gelled condition.

*Example 17.*—100 parts of pentaerythritol linoleate were heated under vacuum at a temperature of 280° C. When the ester reached a viscosity of Z–3 (Gardner-Holdt), 10 parts of lamp black were introduced with vigorous stirring. Air-blowing of the oil was started at the same time, and the heating was continued at 125° C. until the composition reached a solid, gelled condition.

The following are examples of the procedures for the modification of the properties of rubbery butadiene-acrylonitrile copolymers:

*Example 18.*—Hycar OR–15, a butadiene-acrylonitrile copolymer supplied by Hycar Chemical Company, was used in this series of examples. After preliminary break-down of the Hycar, the following mixture was milled on a rubber mill with cooling, according to standard practice, for about 10 minutes:

| | Parts by weight |
|---|---|
| Hycar OR–15 | 100.0 |
| Zinc oxide (low lead content) | 5.0 |
| Stearic acid, double pressed | 0.5 |
| Benzothiazyl disulfide | 1.5 |
| | 107.0 |

Then, 50 parts of channel black were added on the rolls in small increments, these additions being alternated with small portions of solid oxidized and polymerized castor oil (known as Baker's #781 Oil) until 30 parts of the latter had been added. Finally, 1.5 parts of sulfur were added. These additions were made over a period of 15 minutes, after which milling was continued for 5 minutes.

The resulting stock was very readily sheeted off the mill and was much more readily handled than an unplasticized stock. This stock was then vulcanized for 30 minutes at 60 lbs. steam pressure. This gave a somewhat under-cured stock, but these conditions gave a fully cured stock for the reference compound prepared without any added solid oil. The vulcanized compound prepared according to this example was noticeably plasticized, and was used in the adhesion tests described below.

*Example 19.*—This was identical with Example 18, except that 30 parts of solid oxidized and polymerized soyabean oil (known as Baker's E-2) were substituted for the 30 parts of #781 Oil.

*Example 20.*—This was identical with Example 18, except that a mixture of 27 parts of Baker's E-2 and 3 parts of the 2-ethylbutyl ester of mixed soyabean acids (known as Baker's E-290-E) was substituted for the 30 parts of #781 Oil.

*Example 21.*—This was identical with Example 18, except that a mixture of 22.5 parts of solid oxidized and polymerized soyabean oil, 3 parts of solid oxidized and polymerized dehydrated castor oil, the latter having intimately mixed therewith 0.9 part of lignite carbon (Darco) and 3.6 parts of filter aid (Neutrol), this dehydrated castor oil composition being known as Baker's E-2109, was substituted for the 30 parts of #781 Oil.

The reference compound was prepared according to the procedure used in Example 18, except that no solid oil was added. It was observed that the addition of the solid oil greatly facilitated the dispersion of the powdered solids in the rubber.

*Adhesion tests.*—Strips of vulcanized Hycar and of split leather 1" x 6" in size were twice coated on one side over 4" of their length with nitrocellulose cement, each coat being allowed to air-dry for two hours. The cement consisted of 17.6 parts of 6-second lacquer-type nitrocellulose, 4.4 parts of a highly blown castor oil (known as Baker's Pale #4 Oil), and 78.0 parts of acetone. The dried coats were activated with a light brushing of acetone and the sticky surfaces of Hycar and leather were at once put together and joined at room temperature under a pressure of 45 lbs. per square inch for 12 minutes. The adhesion of these samples was determined by holding the free uncemented ends thereof in the testing clamps of a Scott Tester operating at 2 linear inches per minute. The readings obtained gave an indication of the pounds of force needed to separate the Hycar from the leather. These specimens were tested after aging for one hour and 24 hours, respectively, at room temperature.

TABLE 1

*Modified Hycar-leather adhesion tests*

| Example | 1 hour tear | 24 hour tear |
|---|---|---|
| | *Pounds* | *Pounds* |
| Reference Compound | 4 | 9 |
| 18 | 15 | 38 |
| 19 | 10 | 28 |
| 20 | 19 | 30 |
| 21 | 10 | 31 |

This tabulation shows that the addition of the solid oils very greatly increased the ability of the plasticized nitrocellulose cement to produce adhesion between the Hycar and the leather. This is true of both the initial tear determined within one hour and the tear determined after curing for 24 hours. The products made in this manner possessed excellent flexibility and good physical properties.

Another series of results comparable to the above is presented in Table 2. The tensile properties of the rubbers are also reported in Table 2. Baker's #78109 Oil is a solid, gelled oil composed of 70% of castor oil, 10% of dehydrated castor oil, and 20% of filter aid (Neutrol). In the examples reported in Table 2, the rubber stocks were formulated and compounded as in Example 18. Similarly, the adhesion tests were made on joined pairs of Hycar and leather strips.

TABLE 2

*Modified Hycar-leather data*

| Example | Oil | Parts of Oil | Mins. of Cure | Modulus | Tensile Strength | Elongation | Set | Durometer (A) Hardness | Shore Elasticity | 1 hr. Tear | 24 hr. Tear |
|---|---|---|---|---|---|---|---|---|---|---|---|
| | | | | | | | | | | *Pounds* | *Pounds* |
| Reference Compound | | 0 | 30 | 2,450 | 4,000 | 450 | 15 | 80 | 75 | 7.0 | 11.0 |
| 22 | 781 | 10 | 30 | | | | | | | 9.0 | 12.0 |
| 23 | 781 | 20 | 60 | 1,250 | 2,925 | 660 | 35 | 75 | 95 | | 18.0 |
| 24 | 781 | 30 | 30 | | | | | | | 15.5 | 38.5 |
| 25 | 781 | 50 | 30 | 375 | 1,300 | 970 | 100 | 65 | 95 | | 21.0 |
| 26 | 781 | 50 | 45 | 425 | 1,575 | 885 | 85 | 65 | 95 | | 31.0 |
| 27 | 78,109 | 10 | 30 | 1,675 | 3,675 | 575 | 30 | 80 | 80 | 7.0 | 10.0 |
| 28 | 78,109 | 10 | 60 | 2,075 | 3,425 | 505 | 20 | 80 | 80 | 9.0 | 18.0 |
| 29 | 78,109 | 20 | 60 | 1,575 | 3,000 | 530 | 25 | 75 | 80 | | 19.0 |
| 30 | 78,109 | 30 | 30 | 675 | 2,075 | 735 | 55 | 75 | 95 | 6.5 | 29.0 |
| 31 | 78,109 | 50 | 30 | 400 | 1,350 | 875 | 85 | 70 | 90 | | 14.0 |
| 32 | 78,109 | 50 | 45 | 425 | 1,625 | 825 | 70 | 70 | 85 | | 27.0 |

TABLE 3

*Modified Perbunan-leather data*

| Example | Oil | Parts of Oil | Mins. of Cure | Modulus | Tensile Strength | Elongation | Set | Durometer (A) Hardness | Shore Elasticity | 1 hr. Tear | 24 hr. Tear |
|---|---|---|---|---|---|---|---|---|---|---|---|
| | | | | | | | | | | *Pounds* | *Pounds* |
| Reference Compound | | 0 | 90 | 2,150 | 3,025 | 395 | 15 | 75 | 85 | 2.5 | 14.0 |
| 33 | 781 | 10 | 60 | 1,200 | 3,025 | 580 | 30 | 75 | 100 | 3.5 | 19.5 |
| 34 | 781 | 10 | 90 | 1,375 | 3,075 | 535 | 25 | 75 | 100 | 4.0 | 14.0 |
| 35 | 781 | 30 | 90 | 625 | 2,450 | 815 | 60 | 70 | 95 | 12.0 | 32.5 |

As is indicated in Table 2 optimum results are obtained when 30 parts of oil are used with the Hycar. The tear strength drops off somewhat when the amount of solid oil in the rubber stock is increased to 50 parts. The selection of the exact amount of oil to be used will thus depend to some extent on the tensile strength and other properties desired in the finished rubber compound.

In Table 3 are presented the results obtained on the modification of another rubbery butadiene-acrylonitrile copolymer, namely, Perbunan (supplied by Standard Oil Company of New Jersey). The adhesion tests were made on joined strips of Perbunan and leather.

Again, it is evident that this invention provides an effective method for joining rubbery butadiene-acrylonitrile copolymers to other materials. As is shown in Table 3, 30 parts of solid oil are effective in providing improved tear strength in the case of Perbunan. Similar data have been obtained for others of the commercially available rubbery butadiene-acrylonitrile copolymers, and for the joining of rubbery butadiene-acrylonitrile copolymers to materials such as other rubbers, wood, metals, and ceramic materials.

In general, the improved adhesion obtainable by the method of this invention is at its optimum when the rubber stocks are fully cured. It is also of importance that the benefits of this invention can be secured only in the case of rubbery butadiene-acrylonitrile copolymers, and combinations thereof with other polymeric compounds, little or no improvement in adhesion being effected when solid or highly viscous ester-type oils are incorporated in natural or other synthetic rubbers.

What is claimed is:

1. The composition of claim 9, in which said ester oil is a marine oil.
2. The composition of claim 9, in which said ester oil is a synthetic product.
3. The composition of claim 9, in which said ester oil is a pentaerythritol ester of aliphatic, unsaturated acids containing more than 6 carbon atoms.
4. The composition of claim 9, in which said ester oil is a vegetable oil.
5. The composition of claim 9, in which said ester oil is castor oil.
6. The composition of claim 9, in which said ester oil is dehydrated castor oil.
7. The composition of claim 9, modified by the inclusion of from 5% to 30% by weight of a monohydric alcohol ester of vegetable oil acids based on the total oil mixture.
8. The composition of claim 9, modified by the inclusion of from 5% to 30% by weight of a heavy metal soap of vegetable oil acids based on the total oil mixture.
9. A composition comprising a rubbery copolymer of butadiene and acrylonitrile and from about 15% to about 50% by weight, based on said rubbery copolymer of an oxidized and polymerized ester oil having a viscosity within the range from a Saybolt Universal viscosity at 210° F. of 50,000 seconds up to and including that of a solid oil, said copolymer being formed from a mixture comprising butadiene and acrylonitrile in the proportion from 1.22 to 5.67 parts of butadiene per part of acrylonitrile.
10. A composition comprising a rubbery copolymer of butadiene and acrylonitrile and from about 15% to about 50% by weight, based on said rubbery copolymer of an air-blown ester oil having a viscosity within the range from a Saybolt Universal viscosity at 210° F. of 50,000 seconds up to and including that of a solid oil, said copolymer being formed from a mixture comprising butadiene and acrylonitrile in the proportion from 1.22 to 5.67 parts of butadiene per part of acrylonitrile.
11. The method of imparting adhesive characteristics in the presence of a non-rubber adhesive to a composition comprising a rubbery copolymer of butadiene and acrylonitrile which comprises adding to said composition from about 15% to about 50% by weight, based on said rubbery copolymer of an oxidized and polymerized ester oil having a viscosity within the range from a Saybolt Universal viscosity at 210° F. of 50,000 seconds up to and including that of a semi-rubbery, gel-like solid oil, said copolymer being formed from a mixture comprising butadiene and acrylonitrile in the proportion from 1.22 to 5.67 parts of butadiene per part of acrylonitrile.

IVOR M. COLBETH.

REFERENCES CITED

The following references are of record in the file of this patent:

UNITED STATES PATENTS

| Number | Name | Date |
|---|---|---|
| 2,277,259 | Schanabel et al. | Mar. 24, 1942 |
| 2,278,777 | Garvey et al. | Apr. 7, 1942 |
| 2,317,385 | Koch | Apr. 27, 1943 |
| 2,323,562 | Nugent | July 6, 1943 |
| 2,390,961 | Sanderson et al. | Dec. 11, 1945 |
| 2,394,375 | Gross et al. | Feb. 5, 1946 |
| 2,402,909 | Novak | June 25, 1946 |

FOREIGN PATENTS

| Number | Country | Date |
|---|---|---|
| 322,114 | Great Britain | Nov. 28, 1929 |